United States Patent
Mezzavilla et al.

(10) Patent No.: US 11,452,031 B2
(45) Date of Patent: Sep. 20, 2022

(54) SYSTEM, METHOD AND COMPUTER-ACCESSIBLE MEDIUM FOR POWER MEASUREMENT FOR MMWAVE CELLULAR SYSTEM

(71) Applicant: New York University, New York, NY (US)

(72) Inventors: Marco Mezzavilla, Brooklyn, NY (US); Aditya Dhananjay, Brooklyn, NY (US); Dennis Shasha, New York, NY (US); Sundeep Rangan, Jersey City, NJ (US)

(73) Assignee: NEW YORK UNIVERSITY, New York, NY (US)

( * ) Notice: Subject to any disclaimer, the term of this patent is extended or adjusted under 35 U.S.C. 154(b) by 248 days.

(21) Appl. No.: 16/600,017

(22) Filed: Oct. 11, 2019

(65) Prior Publication Data
US 2020/0120583 A1    Apr. 16, 2020

Related U.S. Application Data

(60) Provisional application No. 62/744,169, filed on Oct. 11, 2018.

(51) Int. Cl.
| | |
|---|---|
| *H04W 48/16* | (2009.01) |
| *H04B 17/318* | (2015.01) |
| *H04W 48/20* | (2009.01) |
| *H04W 24/10* | (2009.01) |

(52) U.S. Cl.
CPC ......... *H04W 48/16* (2013.01); *H04B 17/318* (2015.01); *H04W 24/10* (2013.01); *H04W 48/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 2010/0118731 | A1* | 5/2010 | Koyanagi | H04B 17/327 370/252 |
| 2013/0188608 | A1* | 7/2013 | Balachandran | H04W 52/40 370/335 |
| 2021/0067993 | A1* | 3/2021 | Kazmi | H04B 17/24 |
| 2021/0281310 | A1* | 9/2021 | Lee | H04L 5/0048 |

* cited by examiner

*Primary Examiner* — Mandish K Randhawa
(74) *Attorney, Agent, or Firm* — Hunton Andrews Kurth LLP

(57) ABSTRACT

An exemplary system, method and computer-accessible medium for determining a particular base station to connect to by a mobile phone can include, for example, receiving a first synchronization signal from a first base station, where the first synchronization signal can include a first antenna gain correction and a first power allocation correction for the first base station, receiving a second synchronization signal from a second base station, where the second synchronization signal can include a second antenna gain correction and a second power allocation correction for the second base station, and determining whether the first base station or the second base station is the particular base station to connect to by comparing the first synchronization signal to the second synchronization signal.

20 Claims, 10 Drawing Sheets

SYSTEM, METHOD AND COMPUTER-ACCESSIBLE MEDIUM FOR POWER MEASUREMENT FOR MMWAVE CELLULAR SYSTEM

CROSS-REFERENCE TO RELATED APPLICATION(S)

This application relates to and claims priority from U.S. Patent Application No. 62/744,169, filed on Oct. 11, 2018, the entire disclosure of which is incorporated herein by reference.

FIELD OF THE DISCLOSURE

The present disclosure relates generally to a mobile communication or cellular system, and more specifically, to exemplary embodiments of an exemplary system, method, and computer-accessible medium for power measurement for mmWave mobile communication/cellular system.

BACKGROUND INFORMATION

In cellular systems, it is beneficial that mobile nodes accurately measure and report the received power from nearby cells. Power measurements are used for a variety of procedures including open-loop power control, cell selection in idle mode, and measurement reporting for handover in connected mode. Power can refer to any desired quality measure of the transmission that supports information transfer, including a measure of effective signal to noise ratio or a measure of equivalent effective single path signal.

FIG. 1 shows how, in current 3GPP LTE systems, most power measurements can be made from the cell-specific reference signals ("CRS"). CRS signals 102 can be transmitted by each cell 101 in the network (e.g., a "cell" can typically be the component of a base station that transmits on a single carrier in a single sector). The mobile node 103 ("UE") uses the CRS 102 for estimating the downlink channel and the channel estimate can be used for both power measurements and demodulation. 3GPP uses several power measurements in describing measurements and procedure. Each power measurement can be referred to as a received signal strength indicator ("RSSI") 104. The reference signal received power ("RSRP") can be an RSSI 104 that measures the power spectral density of the reference signals. The reference signal received quality ("RSRQ") can be a measure of the signal-to-noise ratio of the reference signals.

In mmWave systems, a CRS 102 may not be available. MmWave transmissions can be highly directional, with the direction of the transmission specific to each UE 103. In contrast, each CRS 102 can be transmitted from a fixed antenna port with a fixed direction. Thus, a CRS 102 may not be able to be used for power measurements, since the power in any particular fixed direction can differ significantly from the power available in an optimally selected direction for a given UE 103.

As shown in a diagram of FIG. 2, to overcome this issue, the 3GPP New Radio ("NR") standard has proposed using measurements from the synchronization signals and physical broadcast channel ("SS/PBCH") signals 201 instead of the CRS 102. The SS/PBCH signals 201 can be transmitted in periodic intervals. The precise timing can be configurable, but typically a burst of SS/PBCH signals 201 can be transmitted approximately once per 5 microservice, a UE 103 can use these SS/PBCH signals 201 for detecting the presence of cells and for measuring the received power from the cells (e.g., both RSRP and RSRQ). In addition, both the SS/PBCH signals 201 and the receiver beamformer 202 can be swept over a plurality of possible directions. The UE can determine the direction with the strongest signal and the power available in that direction. The UE can report this maximum available power. However, there are two complicating issues in measuring the power from synchronization signals (e.g., SS/PBCH 201 or component of these signals) in this manner.

FIG. 3 shows a diagram of a variable antenna gain in the synchronization signal. It can be advantageous for cell 101 not to transmit a synchronization signal 201 in a narrow beam with the highest possible directional gain. With very narrow beams, cell 101 sweeps over a large number of directions which can delay cell 101 search. Instead, faster search can be possible with the cell 101 transmitting in a wider beam in a fixed pattern. However, if cell 101 uses a wide beam for transmitting SS 201, the received power at the UE 103 would not be indicative of the maximum available power. Thus, the RSSI 104 would not be accurate. The use of variable gains also complicates comparing RSSI 104 levels from different cells. If one cell uses a wide beam and a second cell uses a narrow beam, the two RSSI 104 levels could not be compared for the purpose of handover.

FIG. 4 shows a diagram of variable power allocation. If cell 101 uses frequency division multiplexing (e.g. via hybrid or fully digital beamforming), it can be advantageous to allocate only a portion of its transmit power to the synchronization signal 201. This fractional allocation is used to compare the signal strengths from multiple cells and to compute the maximum available power. However, there is no procedure or system for conveying the information of the relative antenna gain and power allocation on the synchronization signals.

Thus, it may be beneficial to provide an exemplary system, and computer-accessible medium for power measurement for mmWave mobile communication/cellular system which can overcome at least some of the deficiencies described herein above.

SUMMARY OF EXEMPLARY EMBODIMENTS

An exemplary system, method and computer-accessible medium for determining a particular base station to connect to by a mobile phone can include, for example, receiving first a first synchronization signal from a first base station, where the first synchronization signal can include a first antenna gain correction and a first power allocation correction for the first base station, receiving a second synchronization signal from a second base station, where the second synchronization signal can include a second antenna gain correction and a second power allocation correction for the second base station, and determining whether the first base station or the second base station is the particular base station to connect to by comparing the first synchronization signal to the second synchronization signal.

In some exemplary embodiments of the present disclosure, the first antenna gain correction can be a first antenna gain used to transmit the first synchronization signal relative to a first reference signal at the first base station, and the second antenna gain correction can be a second antenna gain used to transmit the second synchronization signal relative to a second reference signal at the second base station. The first reference signal can be a first maximum possible antenna gain at the first base station, and where the second reference signal can be a second maximum possible antenna gain at the second base station. The first power allocation correction can be a first power allocated to the first synchronization signal relative to a first reference power at the first base station, and the second power allocation correction can be a second power allocated to the second synchronization signal relative to a second reference power at the second base station. The first reference power can be a first maximum available power at the first base station and the second reference power can be a second maximum available power at the second base station.

In certain exemplary embodiments of the present disclosure, the first synchronization signal can further include a first identifier associated with the first base station, and the second synchronization signal can further include a second identifier associated with the second base station. The first identifier can be a first Physical cell identifier for the first base station, and the second identifier can be a second Physical cell identifier for the second base station. A received strength signal indicator (RSSI) associated with the first base station can be transmitted to the second base station. A corrected RSSI can be received from the second base station. The first synchronization signal and the second synchronization signal can be decoded.

In some exemplary embodiments of the present disclosure, A first received signal strength indicator (RSSI) can be determined based on the first synchronization signal and a second RSSI can be determined based on the second synchronization signal. The determination of whether the first base station or the second base station is the particular base station to connect to can be made based on the first RSSI and the second RSSI. The first RSSI and the second RSSI can be transmitted to the first base station or the second base station to be used in a network determination procedure. The network determination procedure can be used to determine whether to handoff the mobile phone from the first base station to the second base station. A further particular base station to connect to can be determined based on the first RSSI and the second RSSI. An uplink control of the mobile phone can be adjusted based on the first RSSI and the second RSSI, for example, for a random access channel.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Figure 1:
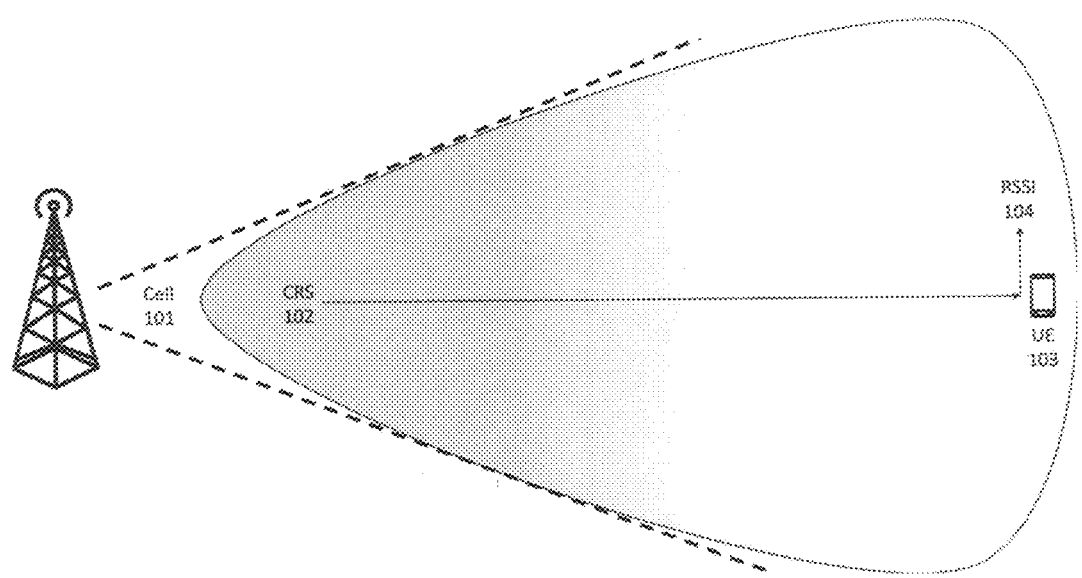
FIG. 1 is an exemplary diagram illustrating 3GPP LTE power measurements.
Figure 2:
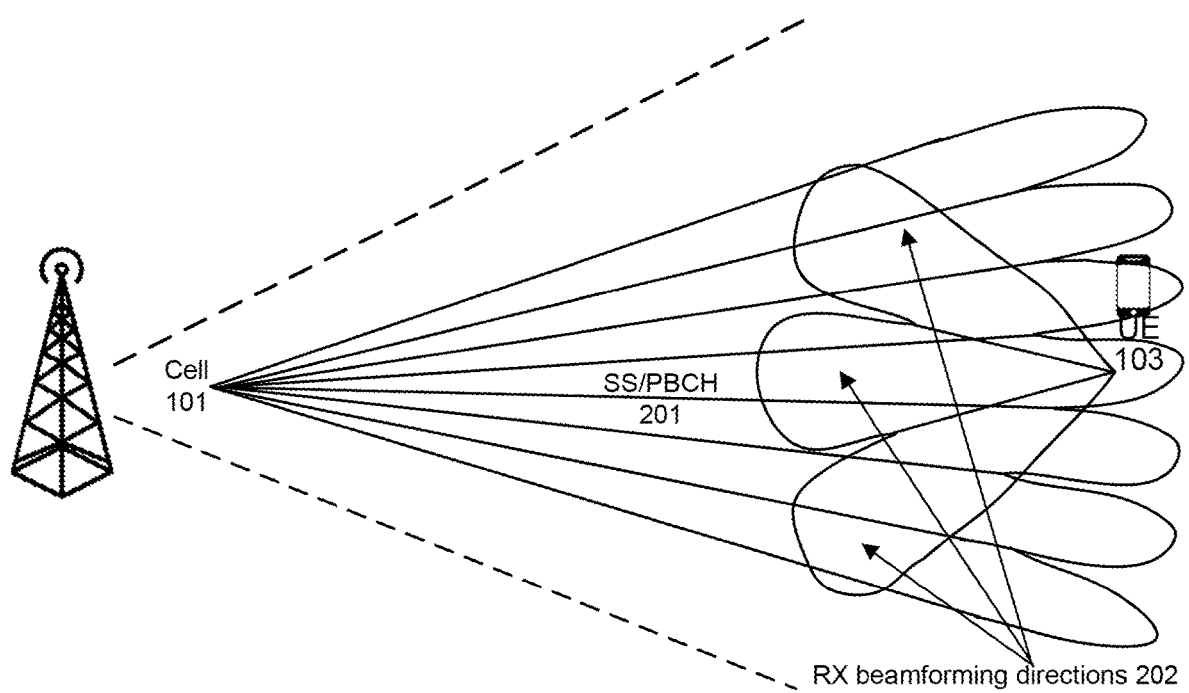
FIG. 2 is an exemplary diagram illustrating 3GPP NR power measurements.
Figure 3:
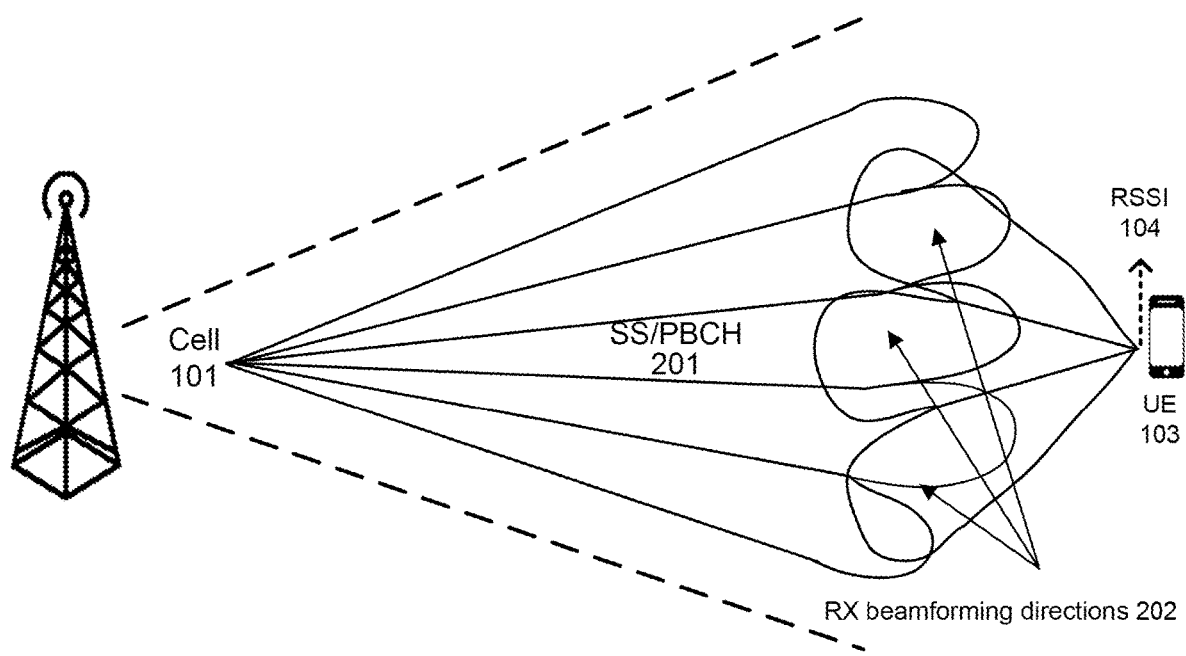
FIG. 3 is an exemplary diagram illustrating power measurements using a variable gain antenna.
Figure 4:
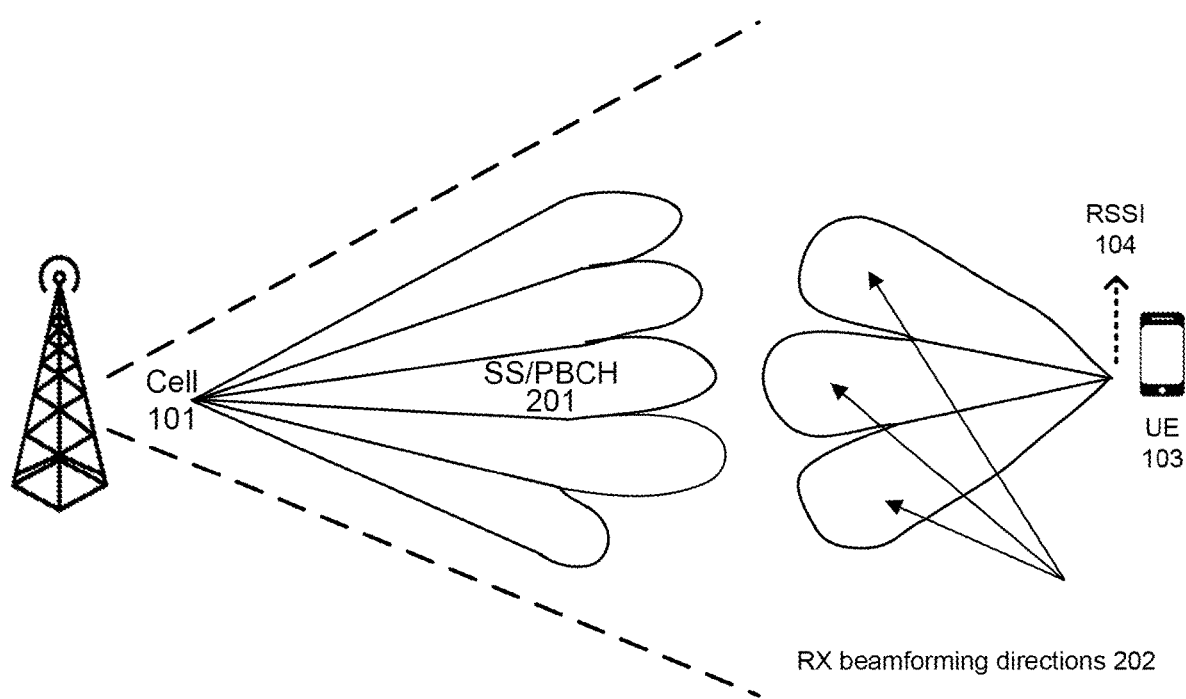
FIG. 4 is an exemplary diagram illustrating variable power allocation.

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

To overcome the lack of information from previous systems, the exemplary systems and methods can be used to communicate two types of power correction information (e.g., antenna gain correction and power allocation correction), as discussed below.

Figure 5:
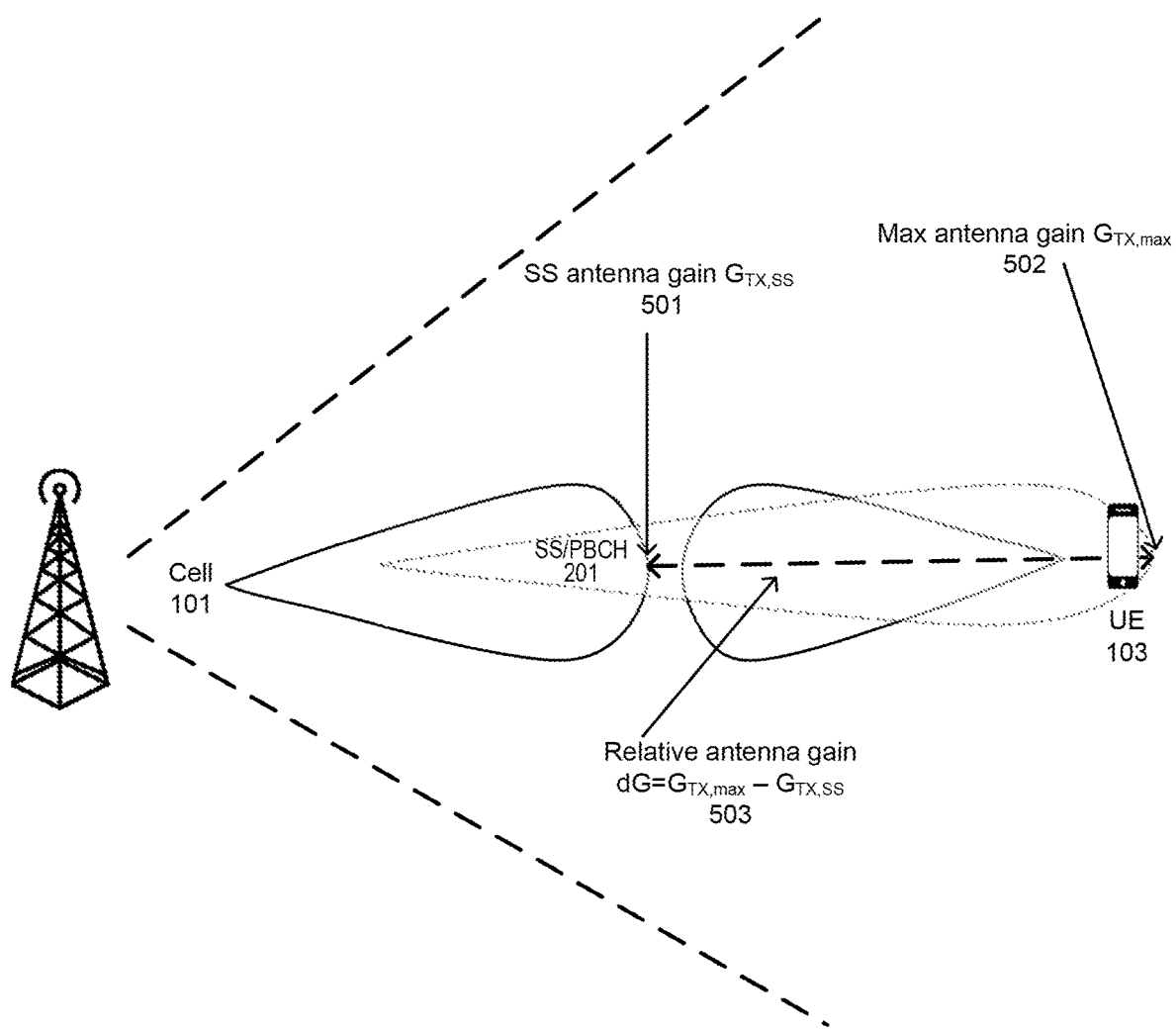
FIG. 5 is an exemplary diagram illustrating SS antenna gain correction according to an exemplary embodiment of the present disclosure.

FIG. 5 shows a diagram of an antenna gain correction according to an exemplary embodiment of the present disclosure. Such data can include some information on the antenna gain used in transmitting the synchronization signal 201 relative to some known reference signal, such as the maximum antenna gain possible 502. For example, this can be the difference 503 $dG=G_{TX,max}-G_{TX,SS}$ where $G_{TX,max}$ 502 can be the maximum antenna gain (e.g., in dBi) and $G_{TX,SS}$ 501 can be the antenna gain used in transmitting the synchronization signal 201.

Figure 6:
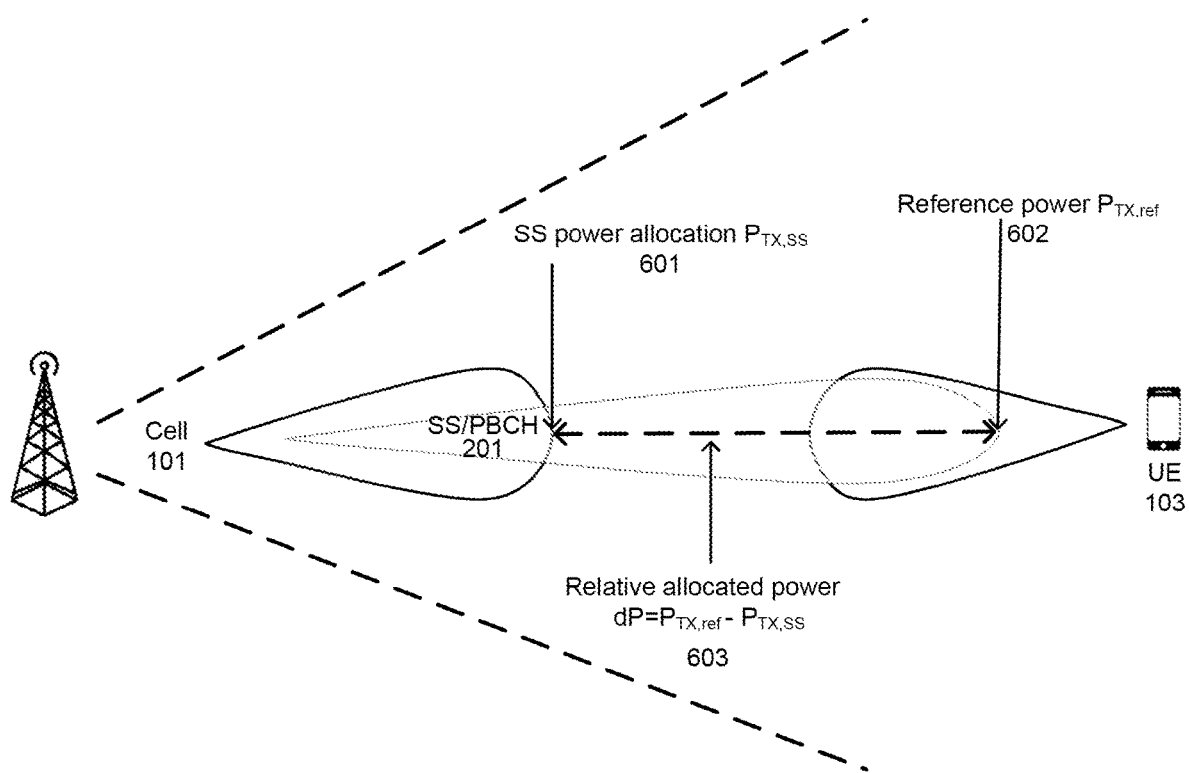
FIG. 6 is an exemplary diagram illustrating SS allocated power correction according to an exemplary embodiment of the present disclosure.

FIG. 6 shows a diagram of an exemplary power allocation correction. This information can contain some information on the power allocated to the synchronization signal 201 relative to some reference power 602. The reference power 602, for example, can be the maximum power available at the cell. The power allocation can be computed, for example, as a difference where 603 $dP=P_{TX,ref}-P_{TX,SS}$, where $P_{TX,ref}$ 602 can be the reference power level (e.g., in dBm) and $P_{TX,SS}$ 601 can be the power used in the synchronization signal. Several exemplary procedures for communicating and using such power correction information as discussed below.

Figure 7:
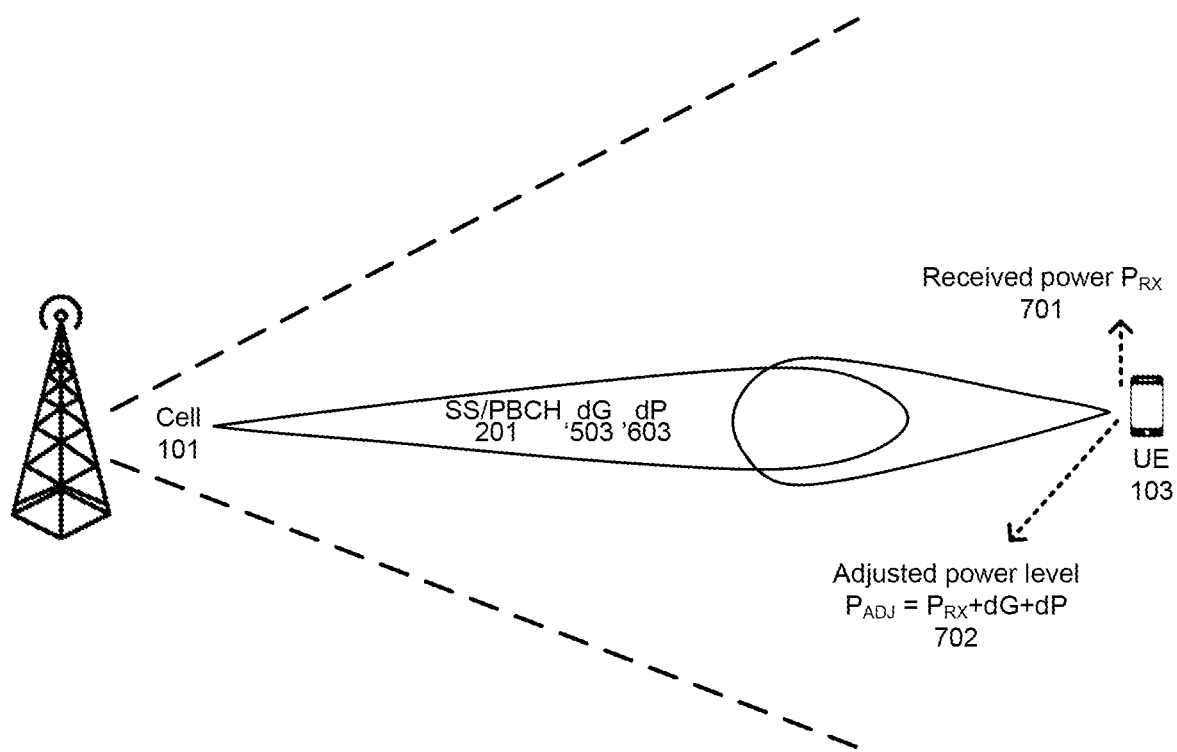
FIG. 7 is an exemplary diagram illustrating intra-cell power correction according to an exemplary embodiment of the present disclosure.

FIG. 7 illustrates an exemplary diagram illustrating intra-cell power correction according to an exemplary embodiment of the present disclosure. The cell can broadcast the synchronization antenna gain correction dG 503 and/or power allocation correction dP 603 to the UE. The UE can decode this correction information. Then, in computing the RSSI 104, the UE can correct the RSSI 104 using that information (e.g., 503,603). For example, if the received power on the synchronization signal is $P_{RX}$ 701, the UE can compute an adjusted received power 702 $P_{ADJ}$=702 $P_{RX}$+dG+dP, to reflect the maximum power available from that cell. The adjusted power level 702 (e.g., RSRP or RSRQ) can then be used in a variety of ways. The adjusted power 702 can be used in the measurement report so that the network has the properly corrected power level for handover decisions. In idle mode, the adjusted power level 702 can be used in cell selection or reselection decisions by the UE. Additionally, the adjusted power level 702 can be used in uplink power control including power control for the random access channel in initial access.

Figure 8:
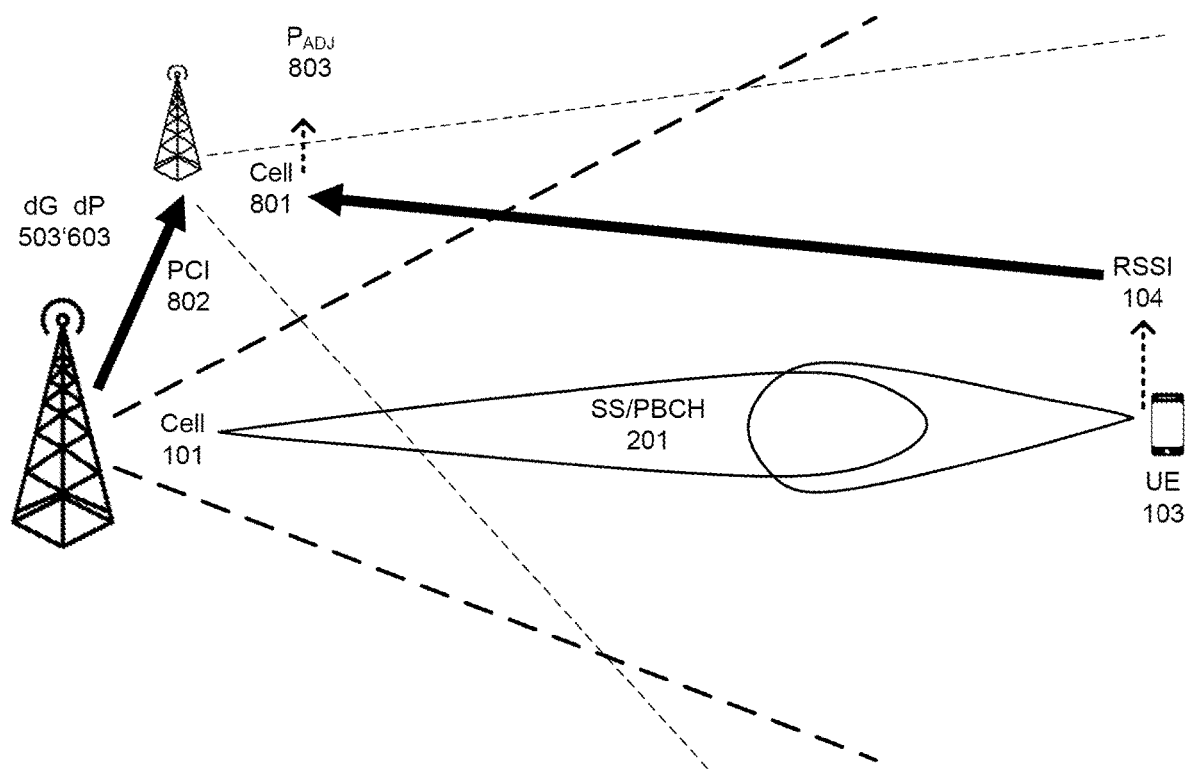
FIG. 8 is an exemplary diagram illustrating inter-cell power correction according to an exemplary embodiment of the present disclosure.

FIG. 8 shows an exemplary diagram illustrating inter-cell power correction according to an exemplary embodiment of the present disclosure. For example, a first cell 101 transmits the synchronization antenna gain correction dG 503 and/or power allocation correction dP 603 to a second cell 801. That information can be sent with some identifier for the first cell 101 (e.g., Physical cell ID ("PCI") 802 or quantity from which the PCI can be determined). The UE 103 can report an RSSI 104 level of the first cell 101 to the second cell 801. The second cell 801 can then correct the RSSI 104 with the synchronization antenna gain correction dG 503 and/or power allocation correction dP 603 received from the first cell 101. The adjusted power level $P_{ADJ}$ 803 can be used, for example, for handover decisions.

As shown in FIG. 8, a potential target cell for handover (e.g., cell 801) can receive RSSIs values of other cells (e.g., cell 101). This can be performed using a Radio Resource Control ("RRC") protocol data unit ("PDU") message sent to cell 801 by the UE. Cell 801 can use the power correction information dG 503 and dP 603 to retrieve the effective RSSI (e.g., P_ADJ 803) between cell 101 and the UE, which can be used for handover decisions.

Although the present disclosure has been described with a base station to user endpoint a wireless network, the exemplary system, method and computer-accessible medium can be used with any radio to radio communication. This can be beneficial when both radios, for example, the base station and the mobile node, have a fully digital multi-antenna architecture, which can facilitate the sensing of the channel in every direction at the same time. In such case, it can be more convenient to let the base stations perform power measurements by receiving uplink ("UL") sounding reference signals ("SRS") that are transmitted directionally by the mobile nodes. Thus, the base stations can quickly characterize the channel quality of each surrounding user without having them provide feedback such information. Thus, the exemplary system can also be used in the reverse link, by simply substituting the synchronization signals SS with sounding reference signals SRS. For such exemplary inverted scenario, the method of communication can be provided as shown in FIG. 7, where the transmitter becomes the UE, and the receiver can be the cell.

Figure 9:
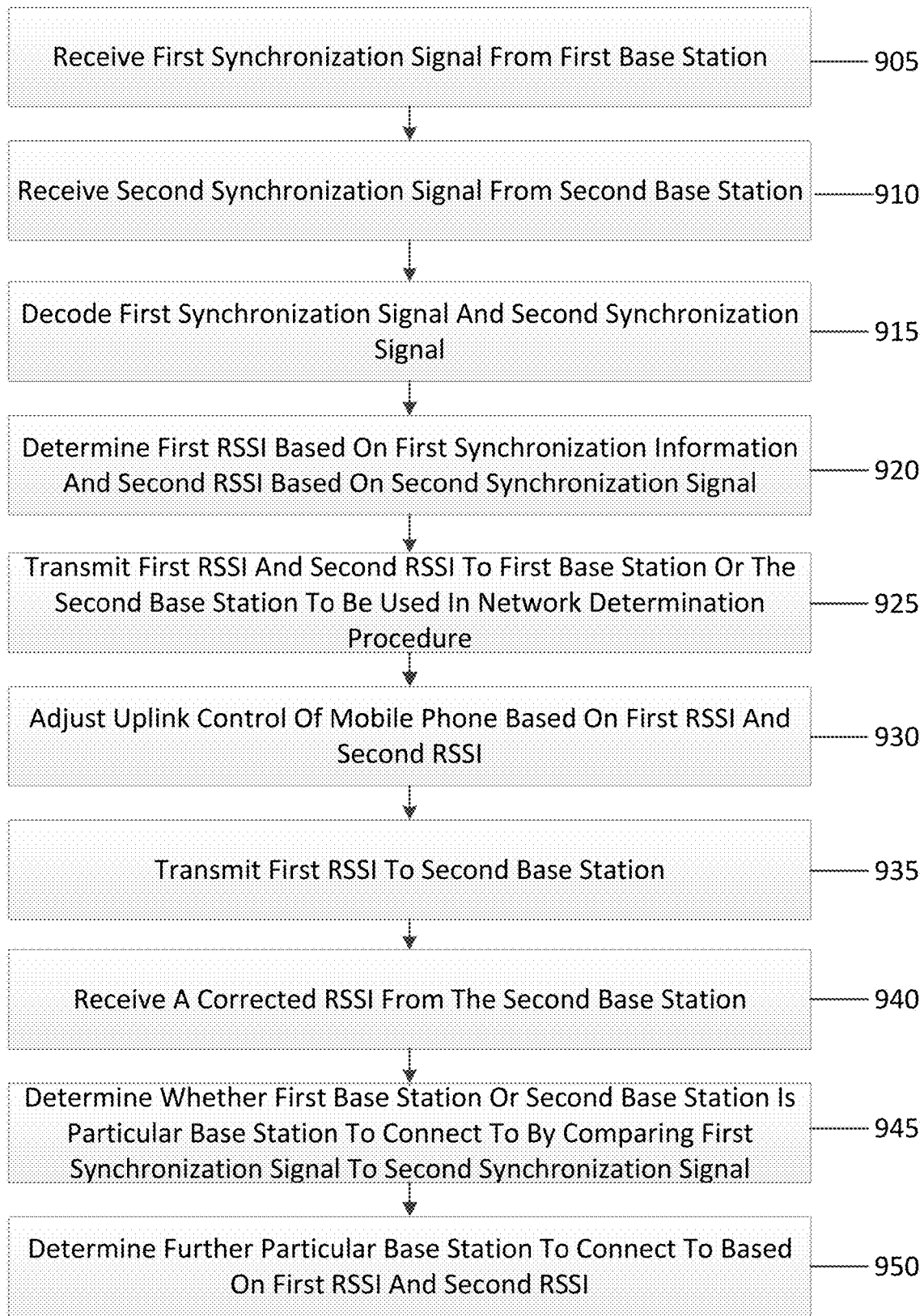
FIG. 9 is an exemplary flow diagram of method for determining a particular base station to connect to by a mobile phone according to an exemplary embodiment of the present disclosure.

FIG. 9 shows an exemplary flow diagram of method 900 for determining a particular base station to connect to by a mobile phone according to an exemplary embodiment of the present disclosure. For example, at procedure 905, a first synchronization signal can be received from a first base station. At procedure 910, a second synchronization signal can be received from a second base station. At procedure 915, the first synchronization signal and the second synchronization signal can be decoded. At procedure 920, a first received signal strength indicator (RSSI) can be determined based on the first synchronization information and a second RSSI can be determined based on the second synchronization signal. At procedure 925, the first RSSI and the second RSSI can be transmitted to the first base station or the second base station to be used in a network determination procedure. At procedure 930, an uplink control of the mobile phone can be adjusted based on the first RSSI and the second RSSI. At procedure 935, the first RSSI can be transmitted to the second base station. At procedure 940, a corrected RSSI can be received from the second base station. At procedure 945, a determination can be made as to whether the first base station or the second base station is the particular base station to connect to by comparing the first synchronization signal to the second synchronization signal. At procedure 950, a further determination can be made as to whether to connect to a further particular base station based on the first RSSI and the second RSSI.

Figure 10:
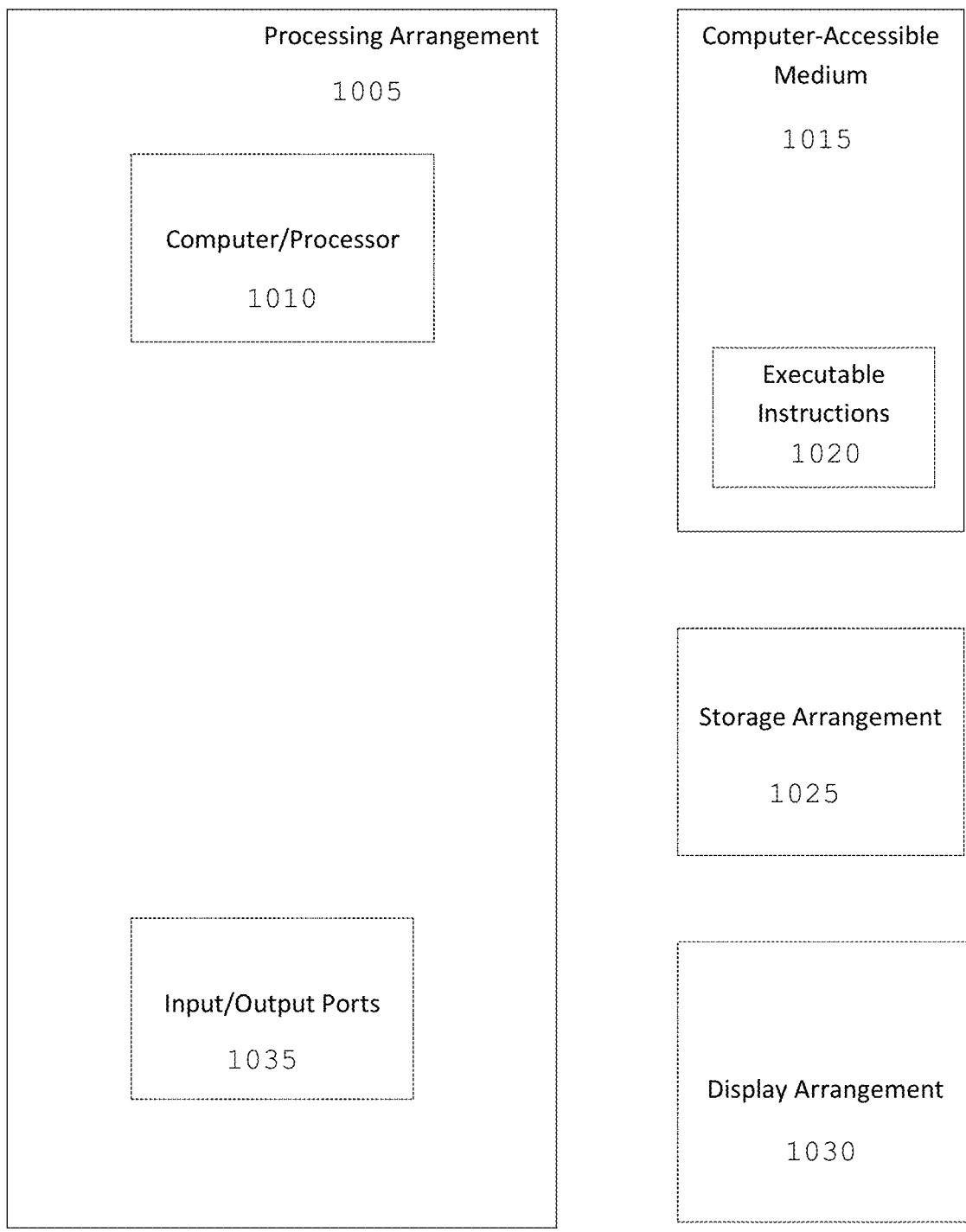
FIG. 10 is an illustration of an exemplary block diagram of an exemplary system in accordance with certain exemplary embodiments of the present disclosure.

FIG. 10 illustrates a block diagram of an exemplary embodiment of a system according to the present disclosure. For example, exemplary procedures in accordance with the present disclosure described herein can be performed by a processing arrangement and/or a computing arrangement (e.g., computer hardware arrangement) 1005. Such processing/computing arrangement 1005 can be, for example entirely or a part of, or include, but not limited to, a computer/processor 1010 that can include, for example one or more microprocessors, and use instructions stored on a computer-accessible medium (e.g., RAM, ROM, hard drive, or other storage device).

As shown in FIG. 10, for example a computer-accessible medium 1015 (e.g., as described herein above, a storage device such as a hard disk, floppy disk, memory stick, CD-ROM, RAM, ROM, etc., or a collection thereof) can be provided (e.g., in communication with the processing arrangement 1005). The computer-accessible medium 1015 can contain executable instructions 1020 thereon. In addition or alternatively, a storage arrangement 1025 can be provided separately from the computer-accessible medium 1015, which can provide the instructions to the processing arrangement 1005 so as to configure the processing arrangement to execute certain exemplary procedures, processes, and methods, as described herein above, for example.

Further, the exemplary processing arrangement 1005 can be provided with or include an input/output ports 1035, which can include, for example a wired network, a wireless network, the internet, an intranet, a data collection probe, a sensor, etc. As shown in FIG. 10, the exemplary processing arrangement 1005 can be in communication with an exemplary display arrangement 1030, which, according to certain exemplary embodiments of the present disclosure, can be a touch-screen configured for inputting information to the processing arrangement in addition to outputting information from the processing arrangement, for example. Further, the exemplary display arrangement 1030 and/or a storage arrangement 1025 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

What is claimed is:

1. A non-transitory computer-accessible medium having stored thereon computer-executable instructions for determining a particular base station to connect to by a mobile phone, wherein, when a computer arrangement executes the instructions, the computer arrangement is configured to perform procedures comprising:
   receiving a first synchronization signal from a first base station, wherein the first synchronization signal includes a first antenna gain correction and a first power allocation correction for the first base station;
   receiving a second synchronization signal from a second base station, wherein the second synchronization signal includes a second antenna gain correction and a second power allocation correction for the second base station; and
   determining whether the first base station or the second base station is the particular base station to connect to by comparing the first synchronization signal to the second synchronization signal,
   wherein:
      the first antenna gain correction is a first antenna gain used to transmit the first synchronization signal relative to a first reference signal at the first base station, and
      the second antenna gain correction is a second antenna gain used to transmit the second synchronization signal relative to a second reference signal at the second base station.

2. The computer-accessible medium of claim 1, wherein the first reference signal is a first maximum possible antenna gain at the first base station, and wherein the second reference signal is a second maximum possible antenna gain at the second base station.

3. The computer-accessible medium of claim 1, wherein:
   the first power allocation correction is a first power allocated to the first synchronization signal relative to a first reference power at the first base station, and
   the second power allocation correction is a second power allocated to the second synchronization signal relative to a second reference power at the second base station.

4. The computer-accessible medium of claim 3, wherein the first reference power is a first maximum available power at the first base station and the second reference power is a second maximum available power at the second base station.

5. The computer-accessible medium of claim 4, wherein:
   the first power allocation correction is further based on a first power used in the first synchronization signal; and
   the second power allocation correction is further based on a second power used in the second synchronization signal.

6. The computer-accessible medium of claim 1, wherein:
   the first synchronization signal further includes a first identifier associated with the first base station, and
   the second synchronization signal further includes a second identifier associated with the second base station.

7. The computer-accessible medium of claim 6, wherein the first identifier is a first Physical cell identifier for the first base station, and the second identifier is a second Physical cell identifier for the second base station.

8. The computer-accessible medium of claim 1, wherein the computer arrangement is further configured to transmit a received strength signal indicator (RSSI) associated with the first base station to the second base station.

9. The computer-accessible medium of claim 8, wherein the computer arrangement is further configured to receive a corrected RSSI from the second base station.

10. The computer-accessible medium of claim 1, wherein the computer arrangement is further configured to decode the first synchronization signal and the second synchronization signal.

11. The computer-accessible medium of claim 1, wherein the computer arrangement is further configured to determine a first received signal strength indicator (RSSI) based on the first synchronization signal and a second RSSI based on the second synchronization signal.

12. The computer-accessible medium of claim 11, wherein the computer arrangement is configured to determine whether the first base station or the second base station is the particular base station to connect to based on the first RSSI and the second RSSI.

13. The computer-accessible medium of claim 12, wherein the computer arrangement is further configured to transmit the first RSSI and the second RSSI to at least one of the first base station or the second base station to be used in a network determination procedure.

14. The computer-accessible medium of claim 13, wherein the network determination procedure is used to determine whether to handoff the mobile phone from the first base station to the second base station.

15. The computer-accessible medium of claim 13, wherein the computer arrangement is further configured to determine a further particular base station to connect to based on the first RSSI and the second RSSI.

16. The computer-accessible medium of claim 13, wherein the computer arrangement is further configured to adjust an uplink control of the mobile phone based on the first RSSI and the second RSSI.

17. The computer-accessible medium of claim 16, wherein the computer arrangement is configured to adjust the uplink control of the mobile phone for a random access channel.

18. A method for determining a particular base station to connect to by a mobile phone, comprising:
   receiving a first synchronization signal from a first base station, wherein the first synchronization signal includes a first antenna gain correction and a first power allocation correction for the first base station;
   receiving a second synchronization signal from a second base station, wherein the second synchronization signal includes a second antenna gain correction and a second power allocation correction for the second base station; and
   using a computer hardware arrangement, determining whether the first base station or the second base station is the particular base station to connect to by comparing the first synchronization signal to the second synchronization signal,
   wherein:
      the first antenna gain correction is a first antenna gain used to transmit the first synchronization signal relative to a first reference signal at the first base station, and
      the second antenna gain correction is a second antenna gain used to transmit the second synchronization signal relative to a second reference signal at the second base station.

19. A system for determining a particular base station to connect to by a mobile phone, comprising:
   a computer hardware arrangement configured to:

receive a first synchronization signal from a first base station, wherein the first synchronization signal includes a first antenna gain correction and a first power allocation correction for the first base station;

receive a second synchronization signal from a second base station, wherein the second synchronization signal includes a second antenna gain correction and a second power allocation correction for the second base station; and determine whether the first base station or the second base station is the particular base station to connect to by comparing the first synchronization signal to the second synchronization signal, wherein:
- the first antenna gain correction is a first antenna gain used to transmit the first synchronization signal relative to a first reference signal at the first base station, and
- the second antenna gain correction is a second antenna gain used to transmit the second synchronization signal relative to a second reference signal at the second base station.

20. The system of claim 19, wherein the first reference signal is a first maximum possible antenna gain at the first base station, and wherein the second reference signal is a second maximum possible antenna gain at the second base station.

\* \* \* \* \*